United States Patent [19]

Ueda

[11] 4,444,417
[45] Apr. 24, 1984

[54] LATCH DEVICE FOR A MOVING RUNNER MEMBER USED IN AN AUTOMATIC SEAT BELT SYSTEM

[75] Inventor: Takeo Ueda, Fujisawa, Japan

[73] Assignee: Nippon Seiko Kabushiki Kaisha, Tokyo, Japan

[21] Appl. No.: 369,566

[22] Filed: Apr. 19, 1982

[30] Foreign Application Priority Data

Apr. 25, 1981 [JP] Japan .............................. 56-59214[U]

[51] Int. Cl.³ ............................................. B60R 21/10
[52] U.S. Cl. .................................................... 280/804
[58] Field of Search ........................ 280/804, 802, 803

[56] References Cited

U.S. PATENT DOCUMENTS

| | | | |
|---|---|---|---|
| 3,971,570 | 7/1976 | Nilsson et al. | 280/804 |
| 4,213,652 | 7/1980 | Irwin et al. | 297/478 |
| 4,286,804 | 9/1981 | Maekawa et al. | 280/804 |
| 4,324,419 | 4/1982 | Ueda | 280/804 |
| 4,334,701 | 6/1982 | Takada | 282/804 |

Primary Examiner—Robert R. Song
Attorney, Agent, or Firm—Shapiro and Shapiro

[57] ABSTRACT

A latch device for a moving runner member used in an automatic seat belt system has a runner member adapted to be moved by a driving member between a seat occupant restraining position and a seat occupant liberating position, an operating member mounted on the runner member for movement between a first position and a second position and connected to the driving member, a lock member supported by the runner member for movement between an engaging position and a non-engaging position, a latch member secured to a vehicle body and adapted to engage and restrain the lock member moved to the engaging position and to be disengaged from the lock member trying to move toward the seat occupant liberating position and thereby release the restraint.

5 Claims, 11 Drawing Figures

LATCH DEVICE FOR A MOVING RUNNER MEMBER USED IN AN AUTOMATIC SEAT BELT SYSTEM

BACKGROUND OF THE INVENTION

1. Field of the Invention

This invention relates to a latch device in an automatic seat belt system for automatically latching a runner member when the runner member comes to a seat occupant restraining position in response to closing of a door, etc. and for automatically unlatching the runner member when the runner member is about to shift from the seat occupant restraining position to a seat occupant liberating position in response to opening of the door, etc.

2. Description of the Prior Art

Various latch devices have heretofore been proposed. In the prior art a lock member movable between an engaging position and a non-engaging position has been provided in a base member secured to a vehicle body and therefore, this base member has unavoidably been bulky.

SUMMARY OF THE INVENTION

It is therefore an object of the present invention to provide a latch device which eliminates the above-noted disadvantage by containing the lock member in a runner member and which is simple as a whole and reliable in operation as well as capable of withstanding a high load applied thereto.

The invention will become fully apparent from the following detailed description of embodiments thereof taken in conjunction with the accompanying drawings.

DESCRIPTION OF THE PREFERRED EMBODIMENTS

Figure 1:
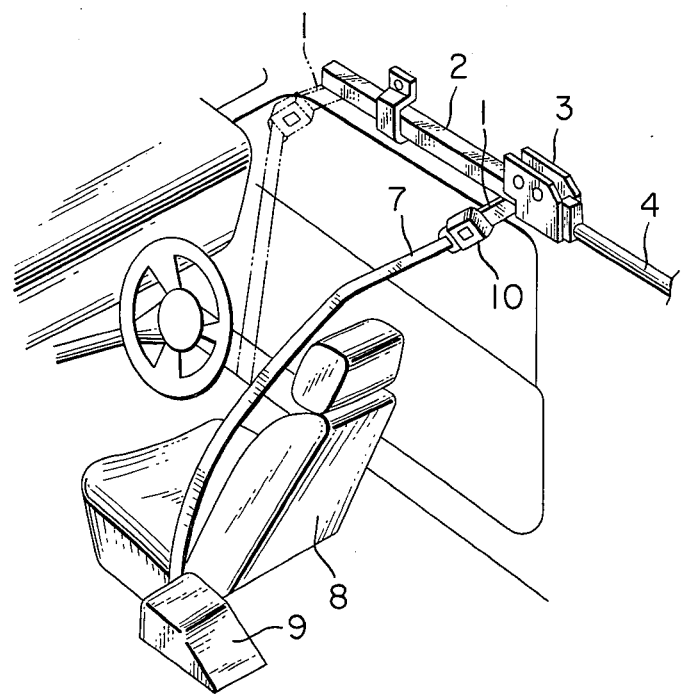
FIG. 1 shows the appearance of an example of the automatic seat belt system to which the present invention is applied.
Figure 2:
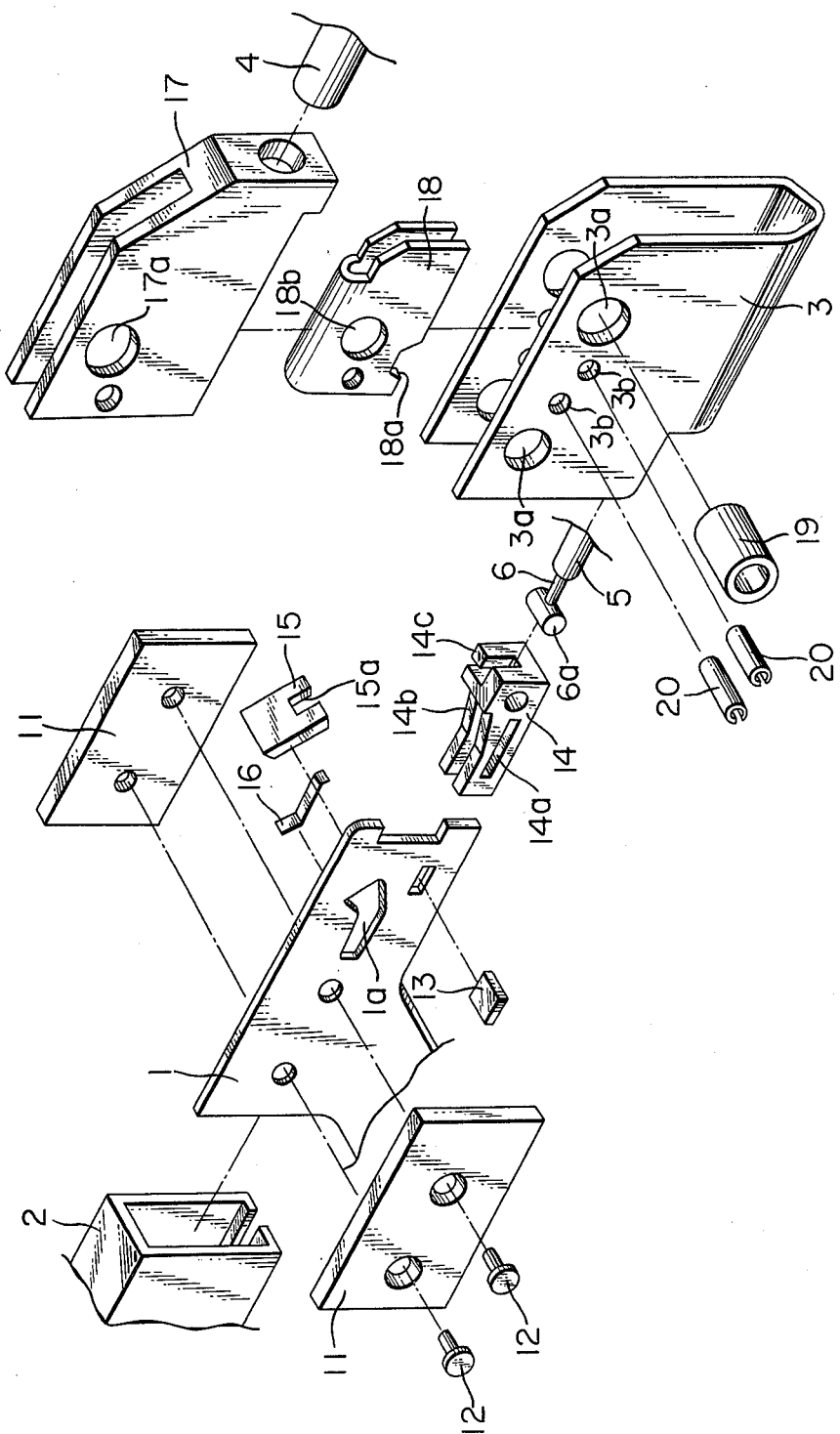
FIG. 2 is an exploded perspective view of a first embodiment of the present invention.

FIG. 1 shows the appearance of an example of the two-point type automatic seat belt system to which an embodiment of the present invention is applied. In this example, a runner member 1 may slide along a rail 2 secured to a side roof between a seat occupant liberating position indicated by dots-and-dash line and a seat occupant restraining position whereat a base 3 is secured, in response to the opening-closing of the door, etc. and this sliding movement is accomplished by a dividing member comprising a wire 6 (FIG. 2) in a guide tube 4. The wire is being moved by a motor, not show, and is covered with a wire tube 5 for soundproofing. Of course, the runner member 1 may also be moved by a mechanical drive utilizing the door opening-closing force.

Now, in the seat belt device shown, webbing 7 is fastened to the runner member 1 through an emergency releasing buckle 10 which is disengageable during emergency, and the webbing 7 extends out from a retractor (not shown) in a retractor-containing case 9 attached to the inner side of a seat 8.

Reference is now had to FIGS. 2 to 6 to describe a first embodiment which comprises a mechanism in the base 3 at the rear end of the guide rail 2. Bushings 11 are fixed to the opposite sides of the runner member 1, by means of pins 12. The runner member is smoothly slidable in the rail 2 and serves as a movable anchor. A mounting plate 13 is further secured to the runner member 1 and a slider 14 is slidably mounted to the runner member 1 by the mounting plate 13 being fitted in a slot 14a formed in the slider 14. The slider 14 has a cam surface 14b, which is an inclined surface, and a cut-away 14c. The slider 14 and the wire 6 are coupled together by a wire anchor 6a fitted in the cut-away 14c. The runner member 1 is formed with a hole 1a in which a lock member 15 and a plate spring 16 are contained, the lock member 15 having a cut-away 15a formed so as to ride astride the runner member 1. The plate spring 16 is guided from the opposite thereof by the bushings 11 and normally biases the lock member 15 towards its upwardly pivoted position, which is an engaging position.

The base 3, together with a spacer 17 and a stopper plate 18, is fixed to the vehicle body by a bolt passed through fixing holes 3a, 17a, 18b. The spacer 17 has the same inner width as the inner width of the rail 2 to permit the runner member 1 to be smoothly brought to the seat occupant restraining position, and the guide tube 4 is fixed to the spacer 17. The stopper plate 18 is formed with a latch surface 18a with which the lock member 15 in engaging position is engaged and thereby restrained. A collar 19 is fitted around a bolt extending through the fixing hole 3a in the base 3, the fixing hole 17a in the spacer 17 and the fixing hole 18b in the stopper plate 18. Pins 20 are fitted in the small holes 3b in the base 3 and serve to position the runner member 1 when it has come to the restraining position.

Where the wire 6 is driven by a motor, electrical switches, such as limit switches for sensing that the runner member 1 has come to the vicinity of the forward and rearward ends of the rail 2, are of course provided near the forward and rearward ends of the rail 2 to de-energize the motor.

Figure 3:
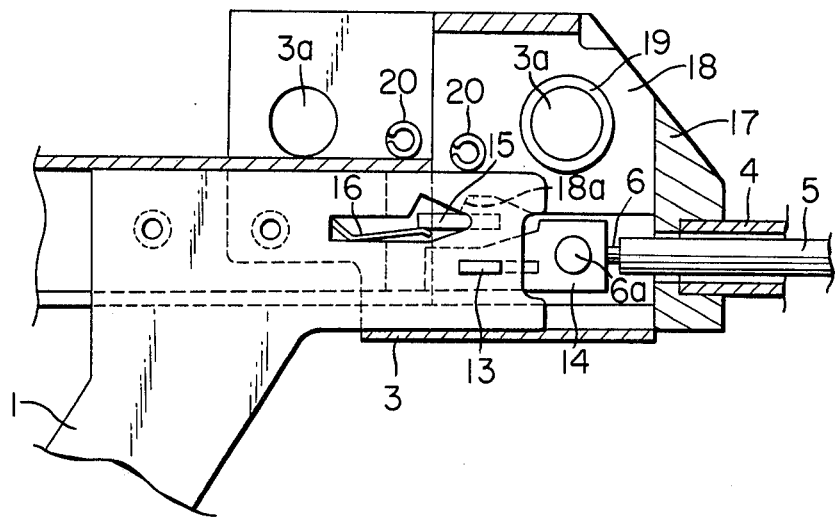
FIGS. 3 to 5 are views partly in cross-section illustrating the operation of the first embodiment.
Figure 4:
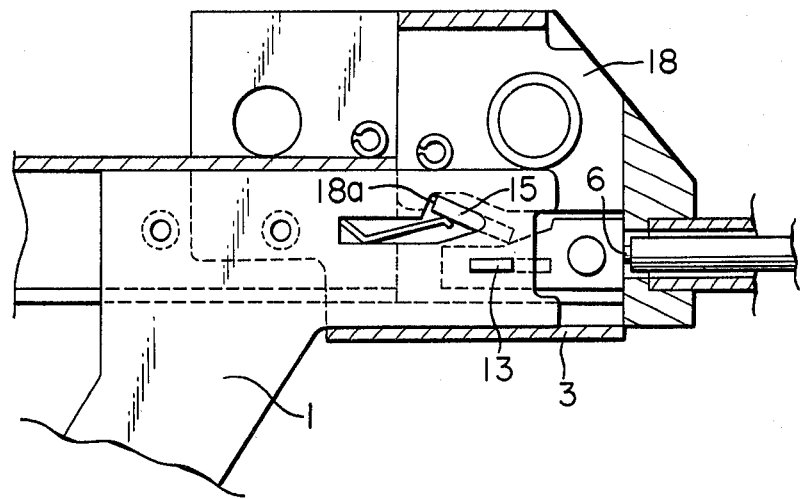
Figure 5:
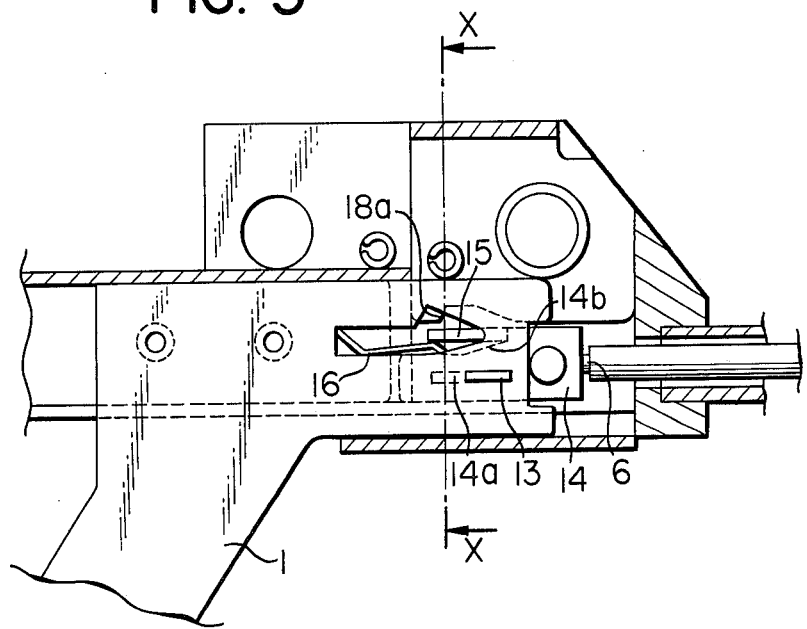

The operation of the first embodiment having the above-described construction will now be described. When the runner member is pulled by the wire 6 and has come to the restraining position, the slider 14 is in a position in which it has been rearwardly slid relative to the runner member 1. Accordingly, the lock member 15 approaches the restraining position while being brought to the engaging position by the plate spring 16. As shown in FIG. 3, immediately before coming to the restraining position, the lock member 15 is pivoted toward the non-engaging position by a protrusion lying adjacent to the latch surface 18a of the stopper plate 18. Then the lock member 15 comes to its position of FIG. 4, in which it is again in the engaging position, and engages the latch surface 18a. Thereupon, the movement of the wire 6 is stopped and the runner member 1 becomes stationary. In the restraining position of FIG. 4, even if a high load is applied to the webbing 7, the forward end of the lock member 15 strikes against the latch surface 18a and this load is received by the vehicle body through the stopper plate 18 and the base 3, so that the runner member 1 remains stopped at the position of FIG. 4.

Figure 6:
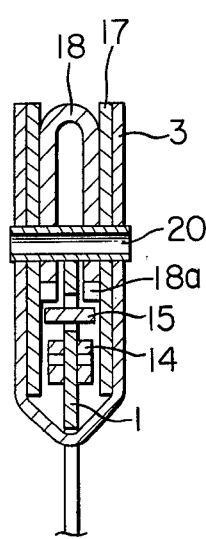
FIG. 6 is a cross-sectional view taken along line X—X of FIG. 5.
Figure 7:
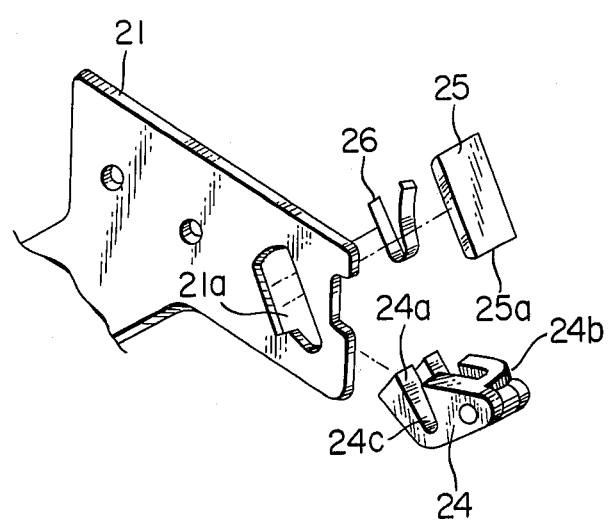
FIG. 7 is an exploded perspective view of a portion of a second embodiment of the present invention.

Next, when the wire 6 tries to move forward upon opening of the door, the slider 14 is pushed forward relative to the runner member 1, such that the cam 14b causes the lock member of 15 to be brought to its downwardly pivoted non-engaging position against the biasing force of the plate spring 16. Thus the engagement between the lock member 15 and the latch surface 18a is released, and simultaneously therewith, the rear end surface of the mounting plate 13 bears against the rear wall surface of the slot 14a in the slider 14, so that a force is transmitted from the wire 6 to the runner member 1 through the slider 14, and the runner member 1 is pushed toward the forward occupant liberating position by the wire 6. FIG. 6 is a cross-sectional view taken along line X—X of FIG. 5.

A second embodiment will now be described by reference to FIGS. 7 to 11.

The second embodiment differs from the first embodiment only in the manner in which a lock member 25 is operated by a lock member holder 24 corresponding to the slider 14. The lock member 25 and a plate spring 26 are contained in a hole 21a formed in a runner member 21, the plate spring 26 having its opposite sides guided by the holder 24 and the lock member 25 being held in a lock member holding cut-out 24a. The holder 24 is designed such that it is not slid by the wire 6 through a wire anchor 6a hooked in a cut-away 24b, but is pivoted with the lock member 25 about the bottom surface 24c of a cut-out 24a bearing against the rear end surface 25a of the lock member 25.

Figure 8:
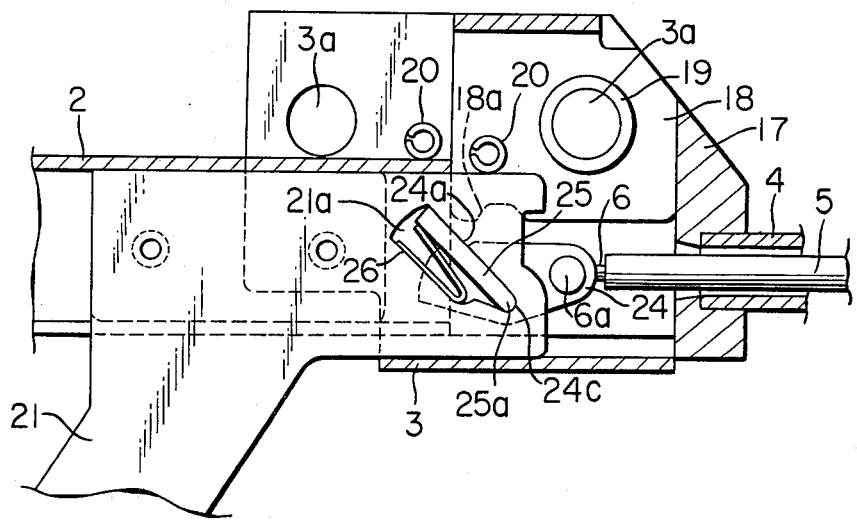
FIGS. 8 to 10 are views partly in cross-section illustrating the operation of the second embodiment.
Figure 9:
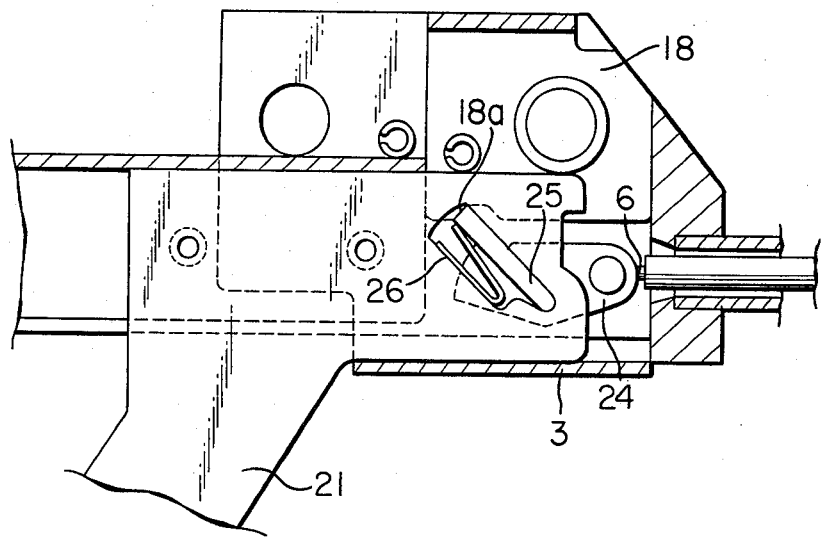

The operation of the second embodiment having such construction will now be described. When the runner member 21 is pulled by the wire 6 and moves toward the restraining position, the lock member holder 24 is in a position in which it, together with the lock member 25, has been upwardly pivoted by the biasing force of the plate spring 26. Consequently, as shown in FIG. 8, the lock member 25 approaches the restraining position while being in the engaging position. Immediately before coming to the restraining position, the lock member 25 is pivoted toward the non-engaging position by a protrusion lying adjacent to the latch surface 18a of the stopper plate 18. Then it comes to the position of FIG. 9, in which it is again brought to the engaging position by the force of the plate spring 26, and the latch surface 18a comes into engagement with the lock member 25. At this time, of course, the lock member holder 24 must also be pivoted somewhat downwardly, and therefore, the wire 6 must have a flexibility which will permit it. Hereupon, the movement of the wire 6 is stopped and the runner member 21 is also caused to become stationary. In the restraining position of FIG. 9, even if a great load is applied to the webbing 7, the lock member 25 remains restrained and this load is received by the vehicle body through the stopper plate 18 and the base 3, so that the runner member 21 remains stopped at the position of FIG. 9.

Figure 10:
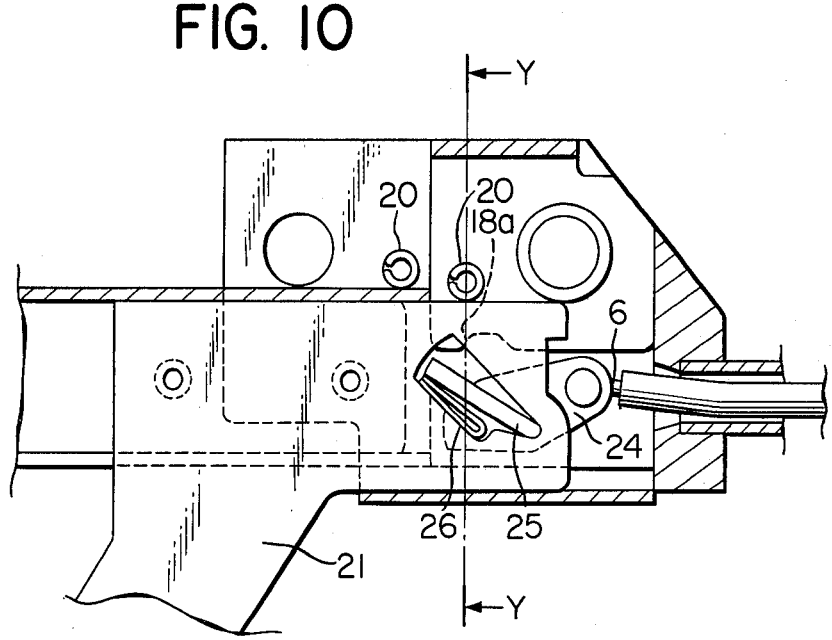
Figure 11:
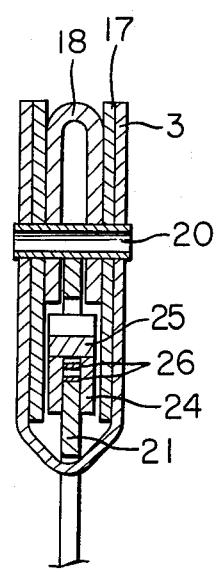
FIG. 11 is a cross-sectional view taken along line Y—Y of FIG. 10.

Next, when the wire 6 tries to move forward upon opening-closing of the door, as shown in FIG. 10, the wire 6 flexes somewhat upwardly to pivot the holder 24 and the lock member 25 downwardly against the biasing force of the plate spring 26 and bring the lock member 25 to the non-engaging position, thereby releasing the engagement between the lock member 25 and the latch surface 18a. Simultaneously therewith, the lock member 25 comes to its completely downwardly pivoted position and becomes unable to move any further relative to the runner member 21, and a drive force is transmitted from the wire 6 to the runner member 21 through the lock member holder 24 and the lock member 25, so that the runner member 21 is pushed toward the forward occupant liberating position by the wire 6. FIG. 11 is a cross-sectional view taken along line Y—Y of FIG. 10.

In the above-described embodiments, the lock member, runner member, stopper plate, base, etc. of which strength is required should be formed of steel plate or the like, while the bushings, slider, lock member holder, spacer, etc. of which strength is not required may preferably be formed of resin or the like with the smoothness of operation, light weight and cost taken into account.

According to the present invention, as has been described above, the lock member which is a movable member is supported on the runner member and therefore, the latch body comprising the base, etc. can be made thin and small, thus enabling the provision of a latch device which is simple, reliable in operation and capable of withstanding a high load.

I claim:

1. A latch device for a moving runner member used in an automatic seat belt system comprising.
   a runner member having webbing attached thereto and adapted to be moved between a seat occupant restraining position and a seat occupant liberating position along a guide member secured to a vehicle body by a drive member movable in response to the opening-closing of a door;
   an operating member mounted on said runner member for movement between a first position and a second position and having one end of said drive member attached thereto, said operating member being adapted to assume said first position by said drive member when moved with said runner member from said seat occupant liberating position to said seat occupant restraining position by said drive member and to move from said first position to said second position and be moved with said runner member by said drive member when it begins to be moved from said seat occupant restraining position to said seat occupant liberating position;
   a biasing means;
   a lock member supported by said runner member for movement between an engaging position and a non-engaging position and biased by said biasing means toward said engaging position, said lock member being capable of assuming said engaging position in accordance with the biasing force of said biasing means when said operating member is in said first position, said operating member having means for moving said lock member to said non-engaging position against said biasing force of said biasing means when said operating member is moved from said first position to said second position; and
   a latch member secured to the vehicle body and adapted to engage and restrain said lock member moved to said engaging position when said runner member is moved to said seat occupant restraining position and to be disengaged from said lock member when said runner member is about to move toward said seat occupant liberating position.

2. The latch device according to claim 1, characterized in that said means for moving said lock member has a cam surface, and when said operating member is moved from said first position to said second position by said drive member, said cam surface engages said lock member to cause it to move from said engaging position to said non-engaging position against the biasing force, and when said operating member is moved from said second position to said first position by said drive member, said cam surface is disengaged from said lock member to cause it to move from said non-engaging position to said engaging position in accordance with the biasing force.

3. The latch device according to claim 2, characterized in that said operating member slides between said first position and said second position in parallel with the moving direction of said runner member.

4. The latch device according to claim 1, characterized in that said operating member moves with said lock member, and when said operating member is moved to said first position by said drive member, said lock member assumes said engaging position in accordance with the biasing force, and when said operating member is moved to said second position by said drive member, said lock member assumes said non-engaging position against the biasing force.

5. The latch device according to claim 4, characterized in that said operating member rotates between said first position and said second position.

* * * * *